Patented Jan. 13, 1953

2,625,551

UNITED STATES PATENT OFFICE 2,625,551

2-ACETOACETYLAMINOTHIOPHENE

Robert Sidney Long, Bound Brook, N. J., assignor to American Cyanamid Company, New York, N. Y., a corporation of Maine No Drawing. Application October 19, 1950, Serial No. 191,081

1 Claim. (Cl. 260—332.2)

This invention relates to new chemical compounds which are useful intermediates in the manufacture of new and valuable azo dyes and it comprises the acylacet derivatives of 2-aminothiophene having the following formula:

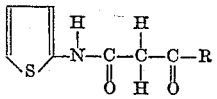

where R is alkyl or aryl such as $CH_3$ or phenyl.

While 2-aminothiophene has been prepared in the past, it has never been useful for making intermediates, because it is extremely unstable and oxidizes in air to a solid mass which cannot be practically utilized. As a result, it has been only a laboratory curiosity, of theoretical but no practical interest.

According to the present invention, it has been found that acylacet derivatives of 2-aminothiophene may be produced in good yield and constitute intermediates for azo dyes, having very desirable properties, particularly for the preparation of yellow azo pigments. The present invention has for its object the preparation of these new acylacet derivatives of 2-aminothiophene. The invention includes, generally from its product aspect, the new chemical compounds, regardless how they are made and is also directed, in a more specific process aspect, to an improved method of making the said acylacet derivatives of 2-aminothiophene, which, up to the present time, is the only practical method.

The problem of overcoming the extreme instability of 2-aminothiophene is solved by the present invention by dealing with a tin chloride double salt of 2-aminothiophene, which is a stable compound. The salt is dispersed in an inert organic solvent; the 2-aminothiophene set free in the solvent by alkali; and then the reaction with the acylacetylating agent, such as diketene, is carried out in the same solution without ever isolating 2-aminothiophene in its unstable solid form. It is not known why the 2-aminothiophene, when formed in a medium constituted of an inert organic solvent, does not decompose. It seems possible that the solution in the inorganic solvent protects the 2-aminothiophene from contact with oxygen. However, the stability is so markedly increased, that it is possible that other than these purely mechanical explanations, there may be other factors involved; and the invention is not intended to be limited to any theory of why it is possible to maintain the 2-aminothiophene in a reasonably stable form in the reaction medium of the present invention.

It is an advantage of the present invention that a wide choice of common, cheap organic solvents is available. In general, it is necessary only that the organic liquid be a solvent and that it react neither with the 2-aminothiophene formed nor with the alkali which is used in the reaction to transform the tin chloride double salt into the free amine. Typical solvents are ethers, such as ethyl ether, aromatic hydrocarbons, such as benzene, toluene, xylene, etc., chlorinated hydrocarbons of the aromatic and aliphatic series, such as monochlorobenzene or ortho-dichlorobenzene, carbon tetrachloride, trichloroethylene and the like.

The acylation which takes place in situ proceeds in a normal manner, using the customary acylating agents, such as diketene. The reaction proceeds smoothly and in the organic solvents the 2-aminothiophene behaves as any ordinary aromatic amine. In spite of the instability of the 2-aminothiophene to oxygen, it apparently reacts satisfactorily particularly with low temperature acylating agents such as diketene. The stability of the 2-aminothiophene in the organic solvent is not absolute and there is considerable advantage in preventing access of oxygen in any considerable quantities. Thus, for example, the reaction can be carried out effectively in a vessel under an atmosphere of nitrogen.

In marked contrast to the highly unstable 2-aminothiophene, the new intermediates of the present invention are stable and well-characterized compounds which can be stored, shipped and which withstand all of the usual procedures involved in using the coupling compounds, either for the production of azo dyes and pigments, or for dyeing procedures, in which they are employed and the color is formed or developed on the goods. It is not known why there should be such an enormous difference in stability between the acylacet derivatives of 2-aminothiophene and the free amine itself; and the invention is not intended to be limited to any theory of why so great a difference in characteristics is encountered.

It is an advantage of the present invention that when my new coupling components are coupled to form azoic coloring matters, dyestuffs and pigments of various shades are obtained which, in general, show good fastness properties. Coupling takes place rapidly with the ordinary diazotized bases, particularly those which are free from solubilizing substituents, such as sulfonic or carboxylic acid groups. Typical amines which can be diazotized and coupled with the new coupling components of the present invention are aniline, its homologs, and their halogen, nitro, alkoxy, aryloxy, azo-amino, sulfone, sulfonamide and cyano derivatives, xenylamine, the various naphthyl amines, aminoazo compounds, benzidine, dianisidine and their derivatives, such as halogen-substituted compounds, derivatives of diamino-stilbene and the like. The new coupling component of the present invention has also adequate coupling power for use in polyazo dyestuffs prepared in successive coupling and diazotizing steps. Excellent stability is shown in all of these reactions. Azoic coloring matters prepared from the new coupling components of the present invention are not claimed, as such, in the present application, but form the subject matter of my copending application Ser. No. 191,082, filed October 19, 1950, simultaneously with the present application.

The invention will be described in greater detail in the following specific example, the parts being by weight unless otherwise specified.

*Example*

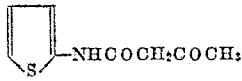

Fifteen (15) parts of the tin chloride double salt of 2-aminothiophene is slurried under nitrogen in 100 parts of water and 140 parts of ether and treated, with cooling, with 63 parts of 5 N sodium hydroxide. The ether layer is separated, dried over sodium sulfate and treated with 3.4 parts of diketene. When the reaction is complete, the 2-acetoacetylaminothiophene is isolated by concentrating, cooling and filtering the solution. If desired, it may be recrystallized from benzene.

The resulting 2-acetoacetylaminothiophene can be used for preparing azo pigments, or for dyeing with stabilized diazo compounds. Thus, for example, when the new coupling component is blended with sucrose and an equivalent quantity of the stabilized diazo compound, prepared by tetrazotizing dianisidine and producing the diazo amino compound by reaction with N-allylglycine and an antiacid in aqueous medium, followed by recovering the diazoamino compound and drying it, this blend is then converted into a printing paste in the conventional manner by using a suitable printing thickener and, when printed on cotton cloth and developed in the usual manner, by exposure to hot acetic acid vapors, produces brownish-orange prints. When the dianisidine is replaced by an equivalent amount of diazotized 2-methyl-5-chloraniline, the resulting prints are yellow. The prints show excellent light fastness.

I claim:
2-acetoacetylaminothiophene.

ROBERT SIDNEY LONG.

REFERENCES CITED

The following references are of record in the file of this patent:

Steinkopf, 448, 214, 221 (1926).

Steinkopf, Die Chemie des Thiophens, pages 21 and 59, Steinkopf, Dresden, 1941.

von Richter, The Chemistry of Carbon Compounds, Ed. 3, vol. III, page 91, Elsevier, New York, 1946.